(12) United States Patent
Kubo et al.

(10) Patent No.: US 9,236,158 B2
(45) Date of Patent: Jan. 12, 2016

(54) SLURRY, PRODUCTION METHOD FOR SOLID ELECTROLYTE LAYER, PRODUCTION METHOD FOR ELECTRODE ACTIVE MATERIAL LAYER, AND PRODUCTION METHOD FOR ALL-SOLID-STATE BATTERY

(75) Inventors: Hiroki Kubo, Susono (JP); Keisuke Omori, Kariya (JP); Yuichi Hashimoto, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 34 days.

(21) Appl. No.: 14/005,477
(22) PCT Filed: Mar. 16, 2012
(86) PCT No.: PCT/JP2012/057660
§ 371 (c)(1), (2), (4) Date: Sep. 16, 2013
(87) PCT Pub. No.: WO2012/128374
PCT Pub. Date: Sep. 27, 2012

(65) Prior Publication Data
US 2014/0004257 A1  Jan. 2, 2014

(30) Foreign Application Priority Data
Mar. 18, 2011 (JP) .................. 2011-060882
Dec. 16, 2011 (JP) .................. 2011-275852

(51) Int. Cl.
*H01B 1/10* (2006.01)
*H01M 10/056* (2010.01)
*H01M 4/04* (2006.01)
*H01M 4/139* (2010.01)
*H01M 4/62* (2006.01)
(Continued)

(52) U.S. Cl.
CPC .............. *H01B 1/10* (2013.01); *H01M 4/0404* (2013.01); *H01M 4/139* (2013.01); *H01M 4/621* (2013.01);
(Continued)

(58) Field of Classification Search
CPC ............ H01B 1/00; H01B 1/10; C01B 25/14; H01M 10/052; H01M 10/0562; H01M 6/18; H01M 2300/0065
See application file for complete search history.

(56) References Cited

U.S. PATENT DOCUMENTS 3,642,436 A    2/1972 Smith, Jr.
5,677,086 A *  10/1997 Satoh et al. .................... 429/223
(Continued)

FOREIGN PATENT DOCUMENTS

CN    101821894 A    9/2010
EP    0 435 844 A1    7/1991
(Continued)

OTHER PUBLICATIONS

Inada et al., "Silicone as a binder in composite electrolytes," *Journal of Power Sources*, 119-121, pp. 948-950, 2003.

*Primary Examiner* — Mark Kopec
(74) *Attorney, Agent, or Firm* — Oliff PLC

(57) ABSTRACT

A main object of the present invention is to provide a practical slurry having a polar solvent as the dispersion medium for a sulfide solid electrolyte material. The present invention solves the above-mentioned problem by providing a slurry having: a sulfide solid electrolyte material, and a dispersion medium having at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding.

19 Claims, 3 Drawing Sheets

(51) Int. Cl.
 H01M 10/0562 (2010.01)
 H01M 10/052 (2010.01)

(52) U.S. Cl.
 CPC .......... H01M 10/052 (2013.01); H01M 10/056 (2013.01); H01M 10/0562 (2013.01); *H01M 2300/0068* (2013.01); *Y02E 60/122* (2013.01)

(56) References Cited

U.S. PATENT DOCUMENTS

| | | | |
|---|---|---|---|
| 8,597,838 B2* | 12/2013 | Liang et al. | 429/335 |
| 2010/0151335 A1* | 6/2010 | Senga et al. | 429/322 |
| 2010/0200795 A1 | 8/2010 | Ota et al. | |
| 2011/0049745 A1* | 3/2011 | Katayama et al. | 264/104 |
| 2014/0120427 A1* | 5/2014 | Suyama et al. | 429/306 |
| 2014/0141339 A1* | 5/2014 | Sugiura et al. | 429/306 |

FOREIGN PATENT DOCUMENTS

| | | |
|---|---|---|
| JP | A-2010-113820 | 5/2010 |
| JP | A-2011-54327 | 3/2011 |
| WO | WO 2004/093099 A1 | 10/2004 |

* cited by examiner

SLURRY, PRODUCTION METHOD FOR SOLID ELECTROLYTE LAYER, PRODUCTION METHOD FOR ELECTRODE ACTIVE MATERIAL LAYER, AND PRODUCTION METHOD FOR ALL-SOLID-STATE BATTERY

TECHNICAL FIELD

The present invention relates to a practical slurry containing a polar solvent as a dispersion medium for a sulfide solid electrolyte material.

BACKGROUND ART

Recently, accompanied by rapid growth of information-related appliances and communication appliances such as personal computers, video cameras and portable phones, development of batteries used as the power source thereof has been regarded important. Moreover, also in the automobile industry, and the like, development of high output and high capacity batteries has been promoted for electric automobiles or hybrid automobiles. Nowadays, among the various batteries, lithium batteries attract attention in regard to the high energy density.

Since the lithium batteries currently commercially available utilize an electrolyte including a combustible organic solvent, improvement is required in terms of the structure and material for prevention of a short circuit or for mounting a safety device for restraining temperature rise at the time of the short circuit. On the other hand, since all-solid-state batteries with the batteries processed to be in an all-solid state with the electrolyte replaced by a solid electrolyte layer do not utilize a combustible organic solvent in the battery, the safety device can be simplified so that it is considered that they can provide the excellent production cost and productivity.

As the solid electrolyte material used for such a solid electrolyte layer, sulfide solid electrolyte materials are known. Moreover, as the solvent for applying the sulfide solid electrolyte materials in a wet process, for example, the non-patent article 1 discloses use of a non-polar solvent such as toluene and heptane.

CITATION LIST

Non-Patent Literature

Non-Patent Literature 1: Taro Inada et al., "Silicone as a binder in composite electrolytes", Journal of Power Sources 119-121 (2003) 948-950

SUMMARY OF INVENTION

Technical Problem

Due to high reactivity of the sulfide solid electrolyte materials, conventionally, the dispersion medium used at the time of preparing a slurry has been limited to the non-polar solvents such as toluene and heptane so that widening of the selection range of the dispersion medium material has been desired. The present invention has been achieved in view of the circumstances mentioned above, and the main object thereof is to provide a practical slurry including a polar solvent as the dispersion medium for a sulfide solid electrolyte material.

Solution to Problem

In order to solve the above-mentioned problem, as a result of the elaborate study by the present inventors, it was found out that some polar solvents, which have been considered inadequate for a dispersion medium for a sulfide solid electrolyte material, may unexpectedly provide a preferable dispersion medium for a sulfide solid electrolyte material by restraining reaction with the sulfide solid electrolyte material so as to complete the present invention. That is, the present invention provides a slurry comprising: a sulfide solid electrolyte material, and a dispersion medium including at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding.

According to the present invention, since a dispersion medium comprising at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding is used, a practical slurry including a polar solvent as a dispersion medium for a sulfide solid electrolyte material can be provided. Thereby, the selection range of the dispersion medium material can be widened.

In the above-mentioned invention, the above-mentioned slurry may further comprise a non-polar solvent. Since a material to be hardly dissolved or dispersed in a dispersion medium as a slurry material can be dissolved or dispersed using the non-polar solvent, the selection range of the slurry material can be widened.

In the above-mentioned invention, it is preferable that the above-mentioned sulfide solid electrolyte material uses a material composition including $Li_2S$ and $P_2S_5$ because a sulfide solid electrolyte material with a high Li ion conductivity can be provided.

In the above-mentioned invention, it is preferable that the ratio of $Li_2S$ and $P_2S_5$ in the above-mentioned material composition be in a range of $Li_2S:P_2S_5=70:30$ to $80:20$ by the molar ratio. Thereby, a stable sulfide solid electrolyte material can be provided and reaction with the above-mentioned dispersion medium can be restrained.

In the above-mentioned invention, it is preferable that the above-mentioned slurry further comprises a binder. Since a binder is included, the slurry viscosity can be made higher so that a further practical slurry can be provided.

Moreover, the present invention provides a production method for a solid electrolyte layer comprising: a mixing step of preparing a solid electrolyte layer forming slurry by mixing a sulfide solid electrolyte material, and a dispersion medium comprising at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding, a coating step of forming a solid electrolyte layer forming coating film by applying the above-mentioned solid electrolyte layer forming slurry on a substrate, and a drying step of forming a solid electrolyte layer by drying the above-mentioned solid electrolyte layer forming coating film.

According to the present invention, since a dispersion medium comprising at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding is used, a practical solid electrolyte layer forming slurry comprising a polar solvent as a dispersion medium for a sulfide solid electrolyte material can be prepared. Thereby, a solid electrolyte layer can be obtained easily using the solid electrolyte layer forming slurry.

In the above-mentioned invention, the above-mentioned solid electrolyte layer forming slurry may be prepared by further adding a non-polar solvent in the above-mentioned mixing step. Since a material to be hardly dissolved or dispersed in a dispersion medium as the above-mentioned solid electrolyte layer forming slurry can be dissolved or dispersed using the non-polar solvent, the selection range of the above-mentioned solid electrolyte layer forming slurry material can be widened.

In the above-mentioned invention, it is preferable that the above-mentioned solid electrolyte layer forming slurry be prepared by further adding a binder in the above-mentioned mixing step. A further practical solid electrolyte layer forming slurry can be prepared so that a further homogeneous solid electrolyte layer can be obtained using the solid electrolyte layer forming slurry.

Moreover, the present invention provides a production method for an electrode active material layer comprising: a mixing step of preparing an electrode active material layer forming slurry by mixing an electrode active material, a sulfide solid electrolyte material, and a dispersion medium comprising at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding, a coating step of forming an electrode active material layer forming coating film by applying the above-mentioned electrode active material layer forming slurry on a substrate, and a drying step of forming an electrode active material layer by drying the above-mentioned electrode active material layer forming coating film.

According to the present invention, since a dispersion medium comprises at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding is used, a practical electrode active material layer forming slurry comprising a polar solvent as a dispersion medium for a sulfide solid electrolyte material can be prepared. Thereby, an electrode active material layer can be obtained easily using the electrode active material layer forming slurry.

In the above-mentioned invention, the above-mentioned electrode active material layer forming slurry may be prepared by further adding a non-polar solvent in the above-mentioned mixing step. Since a material to be hardly dissolved or dispersed in a dispersion medium as the above-mentioned electrode active material layer forming slurry can be dissolved or dispersed using the non-polar solvent, the selection range of the above-mentioned electrode active material layer forming slurry material can be widened.

In the above-mentioned invention, it is preferable that the above-mentioned electrode active material layer forming slurry be prepared by further adding a binder in the above-mentioned mixing step. A further practical electrode active material layer forming slurry can be prepared so that a further homogeneous electrode active material layer can be obtained using the electrode active material layer forming slurry.

The present invention provides a production method for an all-solid-state battery comprising a cathode active material layer including a cathode active material, an anode active material layer including an anode active material, and a solid electrolyte layer formed between the above-mentioned cathode active material layer and the above-mentioned anode active material layer, characterized in that the method comprises at least one step of: a solid electrolyte layer forming step for forming the solid electrolyte layer by the procedure shown in the above-described production method for a solid electrolyte layer, and an electrode active material layer forming step for forming the electrode active material layer by the procedure shown in the above-described production method for an electrode active material layer.

According to the present invention, since at least one of the above-mentioned solid electrolyte layer forming step and the above-mentioned electrode active material layer forming step is included, a layer constituting an all-solid-state battery can be formed homogeneously by a simple method. Thereby, an all-solid-state secondary battery can be produced with high production efficiency.

Advantageous Effects of Invention

The present invention provides an effect of providing a practical slurry comprising a polar solvent as a dispersion medium for a sulfide solid electrolyte.

DESCRIPTION OF EMBODIMENTS

Figure 1:
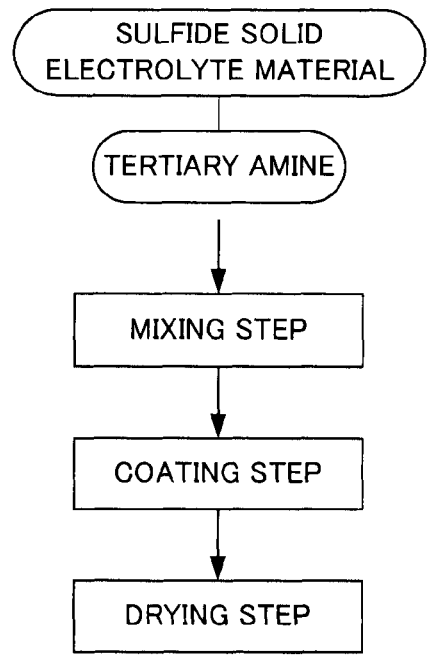
FIG. 1 is a flow chart showing an example of the production method for a solid electrolyte layer of the present invention.

Hereafter, the slurry, the production method for a solid electrolyte layer and the production method for an electrode active material layer of the present invention will be explained in detail.

A. Slurry

First, the slurry of the present invention will be explained. The slurry of the present invention comprises: a sulfide solid electrolyte material, and a dispersion medium comprising at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding.

According to the present invention, since a dispersion medium comprises at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding is used, a practical slurry comprising a polar solvent as a dispersion medium for a sulfide solid electrolyte material can be provided. Thereby, the selection range of the dispersion medium material can be widened.

Hereafter, the slurry of the present invention will be explained for each configuration.

1. Dispersion Medium

First, the dispersion medium in the present invention will be explained. The dispersion medium in the present invention comprises at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding.

The primary amine and the secondary amine have a high reactivity so as to react with a sulfide. On the other hand, the tertiary amine has a nitrogen atom bonded with three hydrocarbon groups, and steric hindrance around an unshared electron pair on a nitrogen atom is large. Thus, the nucleophilicity is weakened and it is considered to have a low reactivity. Accordingly, the tertiary amine may be used as a dispersion medium for a sulfide solid electrolyte material. As examples of the tertiary amine used in the present invention, triethyl amine, tripropyl amine, and tributyl amine can be presented.

Since ether has an oxygen atom having an extremely low reactivity, it is considered to be not reactive with a sulfide, and thus may be used as a dispersion medium for a sulfide solid electrolyte material. As examples of the ether used in the present invention, cyclopentyl methyl ether, dibutyl ether, and anisole can be presented.

Since thiol does not have an oxygen atom with a high reactivity, it is considered to be not reactive with sulfur of a sulfide, and thus may be used as a dispersion medium for a sulfide solid electrolyte material. As examples of the thiol used in the present invention, ethane mercaptan, tert-dodecyl mercaptan, n-butyl mercaptan, t-butyl mercaptan, octane thiol, 1-hexane thiol, 1-propane thiol, and 2-propane thiol can be presented.

Ester having a functional group of a 3 or less carbon number of a small molecular weight bonded on both sides of an ester bonding reacts with a sulfide. On the other hand, ester having a functional group of a 3 or more carbon number bonded with a carbon atom of an ester bonding and ester having a functional group of a 4 or more carbon number bonded with an oxygen atom of the ester bonding are considered to have a lower reactivity owing to the steric hindrance. Accordingly, they may be used as a dispersion medium for a sulfide solid electrolyte material. On the contrary, since ester having a benzene ring bonded with a carbon atom of an ester bonding has an electron donating property, it is considered that eccentricity of charge of a carbonyl group is removed so as to lower the reactivity of an oxygen atom. Accordingly, it may be used as a dispersion medium for a sulfide solid electrolyte material. As examples of esters used in the present invention, butyl butyrate and ethyl benzoate can be presented.

The dispersion medium in the present invention comprises, as mentioned above, at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding. It may be at least one selected therefrom, or it may be a mixture thereof. The above-mentioned tertiary amine, ether, thiol and ester have a low reactivity with a sulfide solid electrolyte material so that they hardly influence the sulfide solid electrolyte material. Thus by using a mixture of the above-mentioned dispersion medium, the selection range can be widened in the case of changing the drying speed of the dispersion medium in drying the slurry of the present invention. For example, a high drying speed is advantageous in terms of the productivity of a product using the above-mentioned slurry. However, if it is too high, a disadvantage such as migration of a binder, may occur, and thus a slow drying operation may be needed. In the present invention, by combining materials having different vapor pressures from any of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding, the drying speed of the dispersion medium can be controlled so as to reduce spots, and the like produced by a drying operation during a coating operation. Moreover, in terms of the reactivity with a sulfide solid electrolyte material, the moisture content of the above-mentioned dispersion medium is preferably lower, and specifically it is preferably 100 ppm or less.

It is preferable that the dispersion medium in the present invention has a dispersion effect (surface-active effect). Here, the dispersion effect refers to an effect of making the sedimentation rate of particles present in a liquid lower than the sedimentation rate obtained from the Stokes formula shown in the following formula (1). In the present invention, by making lower the sedimentation rate of the sulfide solid electrolyte material in the above-mentioned dispersion medium, the dispersion property of the sulfide solid electrolyte material is improved. In the formula, U: sedimentation rate, d: particle size, $\rho_p$: particle specific gravity, $\rho_f$: liquid specific gravity, $\eta$: viscosity, and g: gravitational acceleration.

[Formula 1]

$$U = \frac{d^2 g (\rho_p - \rho_f)}{18 \eta} \quad (1)$$

Moreover, the dispersion medium in the present invention does not dramatically lower the Li ion conductivity of the sulfide solid electrolyte material before and after dispersion of the sulfide solid electrolyte material to the dispersion medium. In general, it does not lower the Li ion conductivity of the sulfide solid electrolyte material after dispersion into the dispersion medium to 1/10 or less of the Li ion conductivity of the sulfide solid electrolyte material before dispersion into the dispersion medium. Here, the Li ion conductivity of the sulfide solid electrolyte material after dispersion into the dispersion medium is obtained by measuring the Li ion conductivity of a sample prepared by shaping a powder obtained by applying a slurry and drying into pellets.

In addition to the above-mentioned dispersion medium, the slurry of the present invention may further comprise a conventional non-polar solvent such as heptane, xylene and toluene. Moreover, in this case, it is particularly preferable to use heptane or toluene. The ratio of the above-mentioned dispersion medium to the total solvent included in the slurry of the present invention is preferably 0.1 wt % or more, it is more preferably 5 wt % or more, and it is further preferably 10 wt % or more. The solvent included in the slurry of the present invention may only be the above-mentioned dispersion medium. Moreover, in the case the slurry of the present invention comprises a binder and the solubility of the binder is low with respect to the above-mentioned dispersion medium, the above-mentioned non-polar solvent may be used in combination. In this case, the ratio of the above-mentioned dispersion medium to the total solvent included in the slurry of the present invention is preferably in a range of 0.1 wt % to 99.9 wt %, it is more preferably in a range of 5 wt % to 95 wt %, and it is further preferably in a range of 10 wt % to 90 wt %. In the present invention, in the case of using the dispersion medium and the non-polar solvent in combination, since a slurry material to be hardly dissolved or dispersed into the dispersion medium can be dissolved or dispersed with the non-polar solvent, the slurry material selection range can be widened.

2. Sulfide Solid Electrolyte Material

Then, the sulfide solid electrolyte material of the present invention will be explained. The sulfide solid electrolyte material of the present invention is not particularly limited as long as it includes sulfur (S) and has the ion conductivity. Here, in the case the slurry of the present invention is used for a lithium battery, as the above-mentioned sulfide solid electrolyte material, those prepared using a material composition including $Li_2S$ and a sulfide of an element of 13 to 15 groups can be presented.

As examples of the above-mentioned element of 13 to 15 groups, B, Al, Si, Ge, P, As, and Sb can be presented. Moreover, as examples of a sulfide of an element of 13 to 15 groups, specifically, $B_2S_3$, $Al_2S_3$, $SiS_2$, $GeS_2$, $P_2S_3$, $P_2S_5$, $As_2S_3$, and $Sb_2S_3$ can be presented. In the present invention, in particular, the sulfide solid electrolyte material prepared using a material composition including $Li_2S$ and a sulfide of an element of 13 to 15 groups is preferably a $Li_2S$—$P_2S_5$ material, a $Li_2S$—$SiS_2$ material, a $Li_2S$—$GeS_2$ material or a $Li_2S$—$Al_2S_3$ material, and it is more preferably a $Li_2S$—$P_2S_5$ material, because they have the excellent Li ion conductivity. The $Li_2S$—$P_2S_5$ material is be a sulfide solid electrolyte material prepared using a material composition including $Li_2S$ and $P_2S_5$ or may be a sulfide solid electrolyte material containing $Li_2S$ and $P_2S_5$ as the main material, and it may further include other materials.

It is preferable that $Li_2S$ included in the above-mentioned material composition has little impurities because side reaction can be restrained thereby. As the method for synthesizing $Li_2S$, for example, a method disclosed in the official gazette of Japanese Patent Laid-Open Publication No. H07-330312 can be presented. Furthermore, it is preferable that $Li_2S$ be refined by a method disclosed in WO2005/040039, and the like. Moreover, in addition to $Li_2S$ and a sulfide of an element of 13 to 15 groups, the above-mentioned material composition may further include at least one kind of ortho-oxoacid lithium selected from the group consisting of $Li_3PO_4$, $Li_4SiO_4$, $Li_4GeO_4$, $Li_3BO_3$ and $Li_3AlO_3$. By adding such ortho-oxoacid lithium, a further stable sulfide solid electrolyte material can be obtained.

It is preferable that the sulfide solid electrolyte material in the present invention does not substantially include cross-linked sulfur. Thereby, reaction with the above-mentioned dispersion medium can be restrained and the decline of the ion conductivity can be restrained. Since the cross-linked sulfur has a high reactivity, reaction with the above-mentioned dispersion medium may cause deterioration of the sulfide solid electrolyte material. Here, the "cross-linked sulfur" refers to the sulfur element of —S— bond generated at the time of synthesis of the sulfide solid electrolyte material. The phrase "substantially not including cross-linked sulfur" denotes that the ratio of the cross-linked sulfur included in the sulfide solid electrolyte material is as low as not being influenced by the reaction with the above-mentioned dispersion medium. In this case, the ratio of the cross-linked sulfur is for example preferably 10 mol % or less, and more preferably 5 mol % or less.

Moreover, "substantially not including cross-linked sulfur" can be confirmed by measuring Raman spectroscopy spectrum. For example, in the case the sulfide solid electrolyte material is a $Li_2S$—$P_2S_5$ material, the peak of a $S_3P$—S—$PS_3$ unit having a cross-linked-sulfur ($P_2S_7$ unit) appears in general at 402 cm$^{-1}$. Therefore, in this invention, it is preferable that the peak is not detected. Moreover, the peak of a $PS_4^{3-}$ unit appears in general at 417 cm$^{-1}$. In this invention, it is preferable that the intensity $I_{402}$ at 402 cm$^{-1}$ be smaller than the intensity $I_{417}$ at 417 cm$^{-1}$. More specifically, with respect to the intensity $I_{417}$, the intensity $I_{402}$ is preferably for example 70% or less, more preferably 50% or less, and further preferably 35% or less. Moreover, also as to the sulfide solid electrolyte materials other than the $Li_2S$—$P_2S_5$ material, whether the cross-linked sulfur is not substantially included can be judged by specifying a unit including cross-linked sulfur and measuring the peak of the unit. In addition to using the measurement result by the Raman spectroscopy spectrum, whether "the cross-linked sulfur is not substantially included" can be confirmed using the material composition ratio at the time of synthesizing the sulfide solid electrolyte material, or the NMR measurement result.

Moreover, in the case the above-mentioned sulfide solid electrolyte material is prepared using a material composition including $Li_2S$, it is preferable that the above-mentioned sulfide solid electrolyte material does not substantially include $Li_2S$. The phrase "does not substantially include $Li_2S$" means that $Li_2S$ derived from the starting material is not substantially included. Since $Li_2S$ has a high reactivity like the cross-linked sulfur, it is preferably not included. Whether "$Li_2S$ is not substantially included" can be confirmed by the X-ray diffraction. Specifically, in the case there is no peak of $Li_2S$ (2θ=27.0°, 31.2°, 44.8°, 53.1°), it can be judged that $Li_2S$ is not substantially included. In the case the $Li_2S$ ratio is too large in the material composition, the sulfide solid electrolyte material tends to include $Li_2S$. On the contrary, in the case the $Li_2S$ ratio is too small in the material composition, the sulfide solid electrolyte material tends to include the above-mentioned cross-linked sulfur.

Moreover, in the case the above-mentioned sulfide solid electrolyte material does not substantially include cross-linked sulfur and $Li_2S$, in general, the above-mentioned sulfide solid electrolyte material has an ortho composition or a composition in the vicinity thereof. Here, ortho refers in general to one having the highest degree of hydration among oxoacids obtained by hydration of the same oxide. In the present invention, the crystal composition with $Li_2S$ most added among the sulfides is referred to as the ortho composition. For example, in the $Li_2S$—$P_2S_5$ system, $Li_3PS_4$ corresponds to the ortho composition. In the $Li_2S$—$SiS_2$ system, $Li_4SiS_4$ corresponds to the ortho composition. In the $Li_2S$—$GeS_2$ system, $Li_4GeS_4$ corresponds to the ortho composition. In the $Li_2S$—$Al_2S_3$ system, $Li_3AlS_3$ corresponds to the ortho composition.

Moreover, in the case of the $Li_2S$—$P_2S_5$ system sulfide solid electrolyte material, the ratio of $Li_2S$ and $P_2S_5$ for obtaining the ortho composition is $Li_2S:P_2S_5$=75:25 on the molar bases. The same is applied to the case of $Li_2S$—$Al_2S_3$ system sulfide solid electrolyte material. On the other hand, in the case of the $Li_2S$—$SiS_2$ system sulfide solid electrolyte material, the ratio of $Li_2S$ and $SiS_2$ for obtaining the ortho composition is $Li_2S:SiS_2=66.7:33.3$ on the molar basis. The same is applied to the case of the $Li_2S$—$GeS_2$ system sulfide solid electrolyte material.

In the case the above-mentioned material composition includes $Li_2S$ and $P_2S_5$, the ratio of $Li_2S$ and $P_2S_5$ in mole equivalent is preferably in a range of $Li_2S:P_2S_5=72:28$ to 78:22, more preferably in a range of $Li_2S:P_2S_5=73:27$ to 77:23, and further preferably in a range of $Li_2S:P_2S_5=74:26$ to 76:24. By having the ratio of $Li_2S$ and $P_2S_5$ in a range of the ratio capable of obtaining the ortho composition ($Li_2S:P_2S_5=75:25$) and the vicinity thereof, a sulfide solid electrolyte material having a low reactivity with the above-mentioned dispersion medium can be obtained. The same is applied to the case that the above-mentioned material composition includes $Li_2S$ and $Al_2S_3$. On the other hand, in the case the above-mentioned material composition includes $Li_2S$ and $SiS_2$, the ratio of the $Li_2S$ and the $SiS_2$ in mole equivalent is preferably in a range of $Li_2S:SiS_2=63:37$ to 70:30, more preferably in a range of $Li_2S:SiS_2=64:36$ to 69:31, and further preferably in a range of $Li_2S:SiS_2=65:35$ to 68:32. By having the ratio of $Li_2S$ and $SiS_2$ in a range of the ratio capable of obtaining the ortho composition ($Li_2S:SiS_2=66.7:33.3$) and the vicinity thereof, a sulfide solid electrolyte material having a low reactivity with the above-mentioned dispersion medium can be obtained. The same is applied to the case that the above-mentioned material composition includes $Li_2S$ and $GeS_2$.

Moreover, it is preferable that the sulfide solid electrolyte material in the present invention include LiI because a sulfide solid electrolyte material having a high Li ion conductivity can be provided. Moreover, it is preferable that the sulfide solid electrolyte material in the present invention include $Li_2O$ because a sulfide solid electrolyte material having a little hydrogen sulfide generation amount can be provided.

The sulfide solid electrolyte material in the present invention may be a sulfide glass, or a sulfide glass ceramic obtained by applying heat treatment to the sulfide glass. The sulfide glass can be obtained by carrying out for example an amorphous process to the above-mentioned material composition. As the amorphous process, for example, a mechanical milling process and a melting and rapid cooling process can be presented. In particular, the mechanical milling process is preferable because processing is enabled in an ordinary temperature so that the production step can be simplified. The mechanical milling is not particularly limited as long as it is a method of mixing a material composition while providing a mechanical energy. For example, ball mill, turbo mill, mechano-fusion, and disc mill can be presented. In particular, the ball mill is preferable, and a planetary ball mill is especially preferable because a desired sulfide solid electrolyte material can be obtained efficiently. Moreover, it is preferable to set the mechanical milling conditions so as to obtain a desired sulfide solid electrolyte material. On the other hand, the sulfide glass ceramic can be obtained by for example applying a heat treatment to the sulfide glass at a temperature higher than the crystallization temperature. That is, by applying the amorphous process to the material composition and further the heat treatment, the sulfide glass ceramic can be obtained. Depending on the heat treatment conditions, there are a possibility of generation of the cross-linked sulfur and $Li_2S$ or a possibility of generation of a stabilized phase, thus in the present invention it is preferable to adjust the heat treatment temperature and the heat treatment time so as not to cause them.

As the shape of the sulfide solid electrolyte material, for example, granular can be presented. In particular, spherical or elliptical are preferable. Moreover, in the case the sulfide solid electrolyte material is granular, it is preferable that its average particle size is for example in a range of 0.1 μm to 50 μm. Moreover, it is preferable that the sulfide solid electrolyte material has a high Li ion conductivity. The Li ion conductivity at an ordinary temperature is preferably for example $1\times10^{-4}$ S/cm or more, and more preferably $1\times10^{-3}$ S/cm or more.

The sulfide solid electrolyte material content in the slurry of the present invention is for example preferably in a range of 10 wt % to 70 wt %, and more preferably in a range of 40 wt % to 60 wt %.

3. Slurry

The slurry of the present invention comprises at least the above-mentioned dispersion medium and sulfide solid electrolyte material. As needed, it may comprise other materials.

It is preferable that the slurry of the present invention further comprises a binder. Since a binder is included, the viscosity of the slurry can be made higher so that the sedimentation rate of the sulfide solid electrolyte material in the dispersion medium can be made slower. Therefore, in forming an all-solid-state battery by applying the above-mentioned slurry, the dispersion state of the sulfide solid electrolyte material obtained by the above-mentioned dispersion medium can be maintained from the start of a coating operation until the end of a drying operation. By drying the applied slurry, a layer with the sulfide solid electrolyte material evenly dispersed can be provided. Therefore, a layer formed using the slurry of the present invention can be one with a further even film thickness and homogeneity. Moreover, since a binder is included, flexibility can be provided to a layer formed using the slurry of the present invention.

The binder used in the present invention is not particularly limited as long as it can be dissolved in a solvent used for the slurry. In the present invention, for example, in the case the solvent used for the slurry is made only of the above-mentioned dispersion medium, a binder dissolvable to the above-mentioned dispersion medium is used. Moreover, for example, a solvent used for the slurry is a solvent mixture of the above-mentioned dispersion medium and a non-polar solvent, a binder dissolvable in the above-mentioned solvent mixture is used.

The binder is not particularly limited. For example, an acrylic binder, a fluorine-including binder such as polyvinylidene fluoride (PVDF) and polytetrafluoro ethylene (PTFE), and a rubber binder such as butadiene rubber can be presented. Moreover, the rubber binder is not particularly limited, however, a hydrogenated butadiene rubber, or a hydrogenated butadiene rubber with a functional group introduced to its end can preferably be used.

In the present invention, among the above-mentioned binders, it is preferable to use a hydrogenated butadiene rubber with a functional group introduced to its end because a higher adhesion performance can be obtained by having the functional group.

The weight average molecular weight of the above-mentioned binder is not particularly limited, however, it is preferably in a range of 50,000 to 1,500,000, more preferably in a range of 100,000 to 1,000,000, and particularly preferably in a range of 100,000 to 800,000. By having the weight average molecular weight in the above-mentioned range, a further practical slurry can be provided.

The weight average molecular weight of the above-mentioned binder is obtained by measurement with the gel permeation chromatography (GPC) conversion on the polystyrene basis.

The binder content in the slurry of the present invention is not particularly limited, however, it is preferably in a range of 0.1 wt % to 10 wt %, more preferably in a range of 0.5 wt % to 5 wt %, and particularly preferably in a range of 0.7 wt % to 2.0 wt %. In the case the binder content is less than the above-mentioned range, the effect of maintaining the dispersion state of the sulfide solid electrolyte material may not be sufficiently obtained. On the other hand, in the case the binder content exceeds the above-mentioned range, the battery characteristics of the all-solid-state battery obtained using the slurry of the present invention may be lowered.

Furthermore, the slurry of the present invention may comprise an electrode active material and an electric conducting material. Since an electrode active material and an electric conducting material are included, an electrode active material layer can be formed using the slurry of the present invention. Moreover, the slurry of the present invention may comprise a dispersion medium other than the above-mentioned dispersion medium, and a dispersing agent.

The slurry of the present invention can be used in producing a solid electrolyte layer of an all-solid-state battery. Moreover, in the case the slurry of the present invention comprises an electrode active material, it can be used in producing an electrode active material layer of a battery. As the production method of the slurry of the present invention, the same production method for a general slurry can be used.

B. Production Method for a Solid Electrolyte Layer

Then, the production method for a solid electrolyte layer of the present invention will be explained. The production method for a solid electrolyte layer according to the present invention comprises: a mixing step of preparing a solid electrolyte layer forming slurry by mixing a sulfide solid electrolyte material, and a dispersion medium comprising at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding; a coating step of forming a solid electrolyte layer forming coating film by applying the above-mentioned solid electrolyte layer forming slurry on a substrate; and a drying step of forming a solid electrolyte layer by drying the above-mentioned solid electrolyte layer forming coating film.

According to the present invention, since a dispersion medium comprises at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding is used, a practical solid electrolyte layer forming slurry comprising a polar solvent as a dispersion medium for a sulfide solid electrolyte material can be prepared. Thus, a solid electrolyte layer can be obtained easily using the solid electrolyte layer forming slurry.

FIG. 1 is a flow chart showing an example of the production method for a solid electrolyte layer of the present invention. In FIG. 1, first, a sulfide solid electrolyte material and a tertiary amine are prepared. Then, they are mixed for preparing a solid electrolyte layer forming slurry (mixing step). Subsequently, by applying the solid electrolyte layer forming slurry onto a substrate, a solid electrolyte layer forming coating film is formed (coating step). Furthermore, by drying the solid electrolyte layer forming coating film, a solid electrolyte layer is formed (drying step).

Hereafter, the production method for a solid electrolyte layer of the present invention will be explained for each step.

1. Mixing Step

First, the mixing step in the present invention will be explained. The mixing step in the present invention is a step of preparing a solid electrolyte layer forming slurry by mixing: a sulfide solid electrolyte material; and a dispersion medium comprising at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding. Since the above-mentioned sulfide solid electrolyte material and the above-mentioned dispersion medium are the same as those mentioned in the above "A. Slurry", the explanation is omitted here.

A solid electrolyte layer forming slurry prepared by this step comprises at least the above-mentioned sulfide solid electrolyte material and the above-mentioned dispersion medium, however, as needed it may further comprise other materials such as a non-polar solvent and a binder. In particular, in this step, it is preferable to prepare a solid electrolyte layer forming slurry while further adding a binder. As for the binder, the same content mentioned in the above "A. Slurry" can be applied.

The content of the above-mentioned sulfide solid electrolyte material in the above-mentioned solid electrolyte layer forming slurry is, for example, preferably in a range of 10 wt % to 70 wt %, and more preferably in a range of 40 wt % to 60 wt %. Moreover, the other aspects of the above-mentioned solid electrolyte layer forming slurry are the same as the content mentioned in the above "A. Slurry".

Moreover, in the above-mentioned solid electrolyte layer forming slurry, as mentioned above, the drying speed of the dispersion medium can be controlled by combining materials having different vapor pressures from any of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding.

The mixing method in this step is not particularly limited as long as a slurry with a high dispersion property can be obtained. For example, common methods such as a dissolver, a homo mixer, a kneader, a roll mill, a sand mill, an attritor, a ball mill, a vibrator mill, a high speed impeller mill, a ultrasonic homogenizer, and a shaker can be adopted.

2. Coating Step

Then, the coating step in the present invention will be explained. The coating step in the present invention is a step of applying the above-mentioned solid electrolyte layer forming slurry onto a substrate for forming a solid electrolyte layer forming coating film.

As the substrate used in this step, for example, peelable ones such as a metal foil and a fluorine-based resin sheet, and an electrode active material layer can be presented. In the case the above-mentioned substrate is an electrode active material layer, it can be applied directly onto an anode active material layer or a cathode active material layer. Moreover, in this step, the method for applying the solid electrolyte layer forming slurry is not particularly limited. For example, common methods such as a doctor blade method, a die coating method, a gravure coating method, a spray coating method, an electrostatic coating method and a bar coating method can be adopted. Moreover, the film thickness of the solid electrolyte layer forming coating film to be formed in this step can be selected appropriately according to the target thickness of the solid electrolyte layer.

3. Drying Step

Then, the drying step in the present invention will be explained. The drying step in the present invention is a step of drying the above-mentioned solid electrolyte layer forming coating film for forming a solid electrolyte layer.

In this step, the method for drying the solid electrolyte layer forming coating film is not particularly limited as long as the solid electrolyte layer forming coating film is not deteriorated. For example, common methods such as hot air drying, infrared ray drying, reduced pressure drying, and induced heating drying can be adopted. Moreover, as the drying atmosphere in this step, for example, inert gas atmosphere such as Ar gas atmosphere and nitrogen gas atmosphere, atmosphere, and vacuum can be presented. Moreover, the thickness of the solid electrolyte layer to be formed in this step is preferably, for example, in a range of 0.1 µm to 1,000 µm, and particularly preferably in a range of 0.1 µm to 300 µm.

4. Other Steps

In addition to the above-mentioned steps, the production method for a solid electrolyte layer of the present invention may have an optional step. As such a step, for example, a compression step can be presented. By having the compression step, a high density solid electrolyte layer can be obtained so that capacity increase can be enabled by the improvement of the ion conductivity and thinning of the solid electrolyte layer film.

C. Production Method for an Electrode Active Material Layer

Then, the production method for an electrode active material layer of the present invention will be explained. The production method for an electrode active material layer of the present invention comprises: a mixing step of preparing an electrode active material layer forming slurry by mixing an electrode active material, a sulfide solid electrolyte material, and a dispersion medium comprising at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding; a coating step of forming an electrode active material layer forming coating film by applying the above-mentioned electrode active material layer forming slurry on a substrate; and a drying step of forming an electrode active material layer by drying the above-mentioned electrode active material layer forming coating film.

According to the present invention, since a dispersion medium comprises at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding is used, a practical electrode active material layer forming slurry comprising a polar solvent as a dispersion medium for a sulfide solid electrolyte material can be prepared. Thus, an electrode active material layer can be obtained easily using the electrode active material layer forming slurry.

Figure 2:
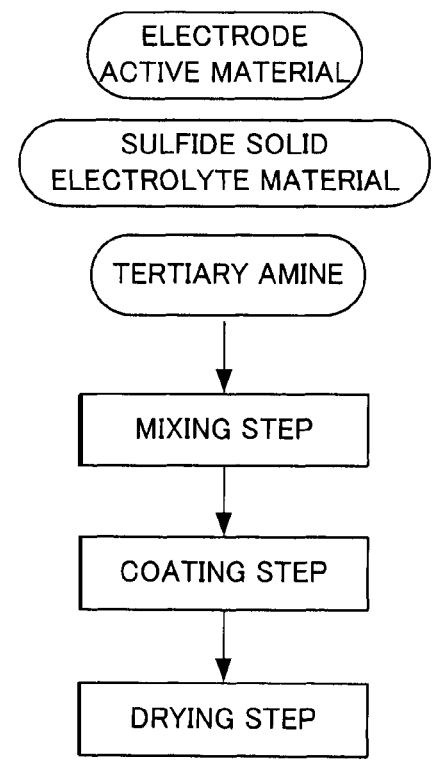
FIG. 2 is a flow chart showing an example of the production method for an electrode active material layer of the present invention.

FIG. 2 is a flow chart showing an example of the production method for an electrode active material layer of the present invention. In FIG. 2, first, an electrode active material, a sulfide solid electrolyte material, and a tertiary amine are prepared. Then, they are mixed for preparing an electrode active material layer forming slurry (mixing step). Subsequently, by applying the electrode active material layer forming slurry onto a substrate, an electrode active material layer forming coating film is formed (coating step). Furthermore, by drying the electrode active material layer forming coating film, an electrode active material layer is formed (drying step).

Hereafter, the production method for an electrode active material layer of the present invention will be explained for each step.

1. Mixing Step

First, the mixing step in the present invention will be explained. The mixing step in the present invention is a step of preparing an electrode active material layer forming slurry by mixing an electrode active material, a sulfide solid electrolyte material, and a dispersion medium comprising at least one selected from the group consisting of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding. Since the above-mentioned sulfide solid electrolyte material and the above-mentioned dispersion medium are the same as those mentioned in the above "A. Slurry", the explanation is omitted here.

The electrode active material in the present invention differs depending on the kind of the conductive ion of the battery to use an electrode active material layer produced by the present invention. For example, in the case the above-mentioned electrode active material layer is used for a lithium secondary battery, the electrode active material absorbs and desorbs the lithium ion. Moreover, the electrode active material used in the present invention may be a cathode active material or an anode active material.

As examples of the cathode active material used in the present invention, halite stratiform type active materials such as $LiCoO_2$, $LiMnO_2$, $LiNiO_2$, $LiVO_2$, and $LiNi_{1/3}Co_{1/3}Mn_{1/3}O_2$, Spinel type active materials such as $LiMn_2O_4$, and $Li(Ni_{0.5}Mn_{1.5})O_4$, and Olivine type active materials such as $LiFePO_4$, $LiMnPO_4$ can be presented. Moreover, Si-including oxides such as $Li_2FeSiO_4$, and $Li_2MnSiO_4$ may be used as the cathode active material.

On the other hand, as the anode active material used in the present invention, for example, metal active materials and carbon active materials can be presented. As the metal active material, for example, In, Al, Si, and Sn can be presented. On the other hand, as the carbon active material, for example, mesocarbon microbeeds (MCMB), highly oriented graphite (HOPG), hard carbon, and soft carbon can be presented.

As the shape of the electrode active material, for example, granular can be presented. In particular, spherical or elliptical are preferable. Moreover, in the case the electrode active material is granular, it is preferable that its average particle size be, for example, in a range of 0.1 µm to 50 µm.

An electrode active material layer forming slurry prepared by this step comprises at least the above-mentioned electrode active material, the above-mentioned sulfide solid electrolyte material and the above-mentioned dispersion medium, however, as needed it may further comprise other materials such as a non-polar solvent, an electric conducting material and a binder. By adding the electric conducting material, the conductivity of the electrode active material layer produced by the present invention can be improved. As the electric conducting material, for example, acetylene black, Ketjen black, and carbon fiber can be presented. In this step, in particular, it is preferable to prepare an electrode active material layer forming slurry while further adding a binder. As for the binder, and the like, the content is the same as those mentioned in the above "A. Slurry", thus the explanation is omitted here.

The ratio of the above-mentioned electrode active material and the above-mentioned solid electrolyte material included in the above-mentioned electrode active material layer forming slurry based on the weight is preferably in a range of electrode active material:solid electrolyte material=1:9 to 9:1, and more preferably in a range of electrode active material:solid electrolyte material=2:8 to 6:4. Moreover, the solid content in the above-mentioned electrode active material layer forming slurry is preferably in a range of 10 wt % to 80 wt %, and more preferably in a range of 40 wt % to 70 wt %. Here, the solid content denotes the ratio of the total weight of the above-mentioned electrode active material and the above-mentioned solid electrolyte material with respect to the weight of the above-mentioned electrode active material layer forming slurry. Moreover, the other aspects of the above-mentioned electrode active material layer forming slurry are the same as the content mentioned in the above "A. Slurry".

Moreover, in the above-mentioned electrode active material layer forming slurry, as mentioned above, the drying speed of the dispersion medium can be controlled by combining materials having different vapor pressures from any of tertiary amine; ether; thiol; ester having a functional group of a 3 or more carbon number bonded with a carbon atom of an ester bonding and a functional group of a 4 or more carbon number bonded with an oxygen atom of the ester bonding; and ester having a benzene ring bonded with a carbon atom of an ester bonding.

Since the mixing method in this step is the same as the content mentioned in the above-mentioned "B. Production method for a solid electrolyte layer", the explanation is omitted here.

2. Coating Step

Then, the coating step in the present invention will be explained. The coating step in the present invention is a step of applying the above-mentioned electrode active material layer forming slurry onto a substrate for forming an electrode active material layer forming coating film.

As the substrate used in this step, for example, peelable ones such as a fluorine-based resin sheet, and a current collector can be presented. Moreover, in the case an electrode active material layer produced by the present invention is used for an all-solid-state battery, a solid electrolyte layer may also be used as the substrate. In this step, since the method for applying the electrode active material layer forming slurry is the same as the content mentioned in the above-mentioned "B. Production method for a solid electrolyte layer", the explanation is omitted here. Moreover, the film thickness of the electrode active material layer forming coating film to be formed in this step can be selected appropriately according to the target thickness of the electrode active material layer.

3. Drying Step

Then, the drying step in the present invention will be explained. The drying step in the present invention is a step of drying the above-mentioned electrode active material layer forming coating solution for forming an electrode active material layer.

In this step, since the method for drying the electrode active material layer forming coating film, and the drying atmosphere are the same as the content mentioned in the above-mentioned "B. Production method for a solid electrolyte layer", the explanation is omitted here. Moreover, the thickness of the electrode active material layer to be formed in this step is preferably, for example, in a range of 0.1 μm to 1,000 μm.

4. Other Steps

In addition to the above-mentioned steps, the production method for an electrode active material layer of the present invention may have an optional step. Since these steps are the same as the content mentioned in the above-mentioned "B. Production method for a solid electrolyte layer", the explanation is omitted here.

D. Production Method for An All-Solid-State Battery

The production method for an all-solid-state battery of the present invention comprises a cathode active material layer including a cathode active material, an anode active material layer including an anode active material, and a solid electrolyte layer formed between the above-mentioned cathode active material layer and the above-mentioned anode active material layer, comprising at least one step of: a solid electrolyte layer forming step for forming a solid electrolyte layer by the procedure shown in the "B. Production method for a solid electrolyte layer", and an electrode active material layer forming step for forming an electrode active material layer by the procedure shown in the "C. Production method for an electrode active material layer".

According to the present invention, since at least one step of the above-mentioned solid electrolyte layer forming step and the above-mentioned electrode active material layer forming step is included, a layer including an all-solid-state battery can be formed homogeneously by a simple method. Thereby, an all-solid-state secondary battery can be produced with a high productivity.

Figure 3:
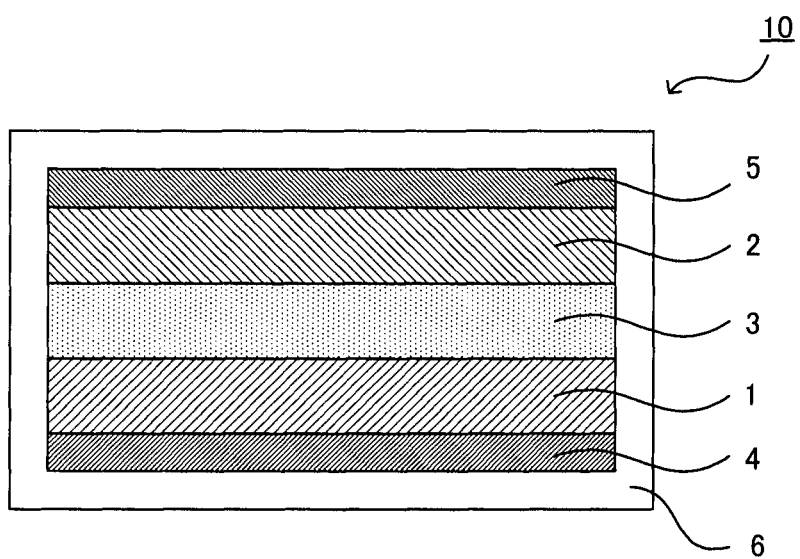
FIG. 3 is a schematic cross-sectional view showing an example of an all-solid-state battery produced by the production method for an all-solid-state battery of the present invention.

FIG. 3 is a schematic cross-sectional view showing an example of an all-solid-state battery produced by the production method of the present invention. The all-solid-state battery 10 shown in FIG. 3 comprises a cathode active material layer 1 including a cathode active material, an anode active material layer 2 including an anode active material, and a solid electrolyte layer 3 formed between the cathode active material layer 1 and the anode active material layer 2. Moreover, it comprises a cathode current collector 4 for collecting current of the cathode active material layer 1, and an anode current collector 5 for collecting current of the anode active material layer 2. Moreover, the all-solid-state battery 10 is sealed in a battery case 6.

Figure 4A:
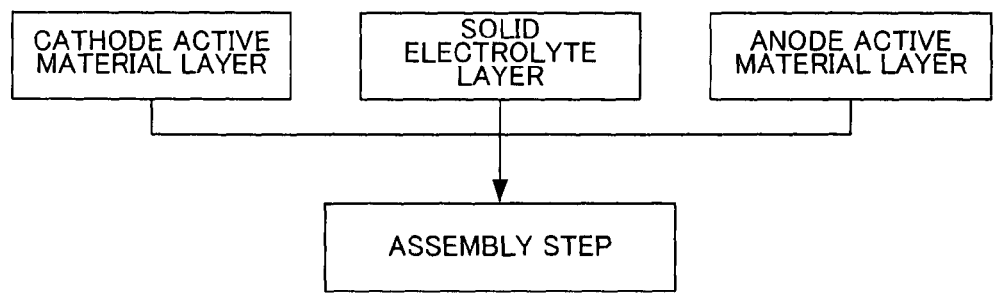
FIGS. 4A and 4B are each a flow chart showing an example of the production method for an all-solid-state battery of the present invention.
Figure 4B:
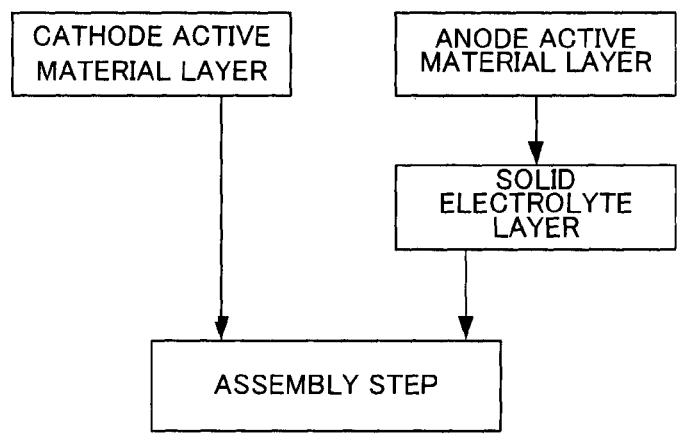

FIGS. 4A and 4B are each a flow chart showing an example of the production method for an all-solid-state battery of the present invention. In FIG. 4A, first, a cathode active material layer is formed (cathode active material layer forming step). Then, an anode active material layer is formed (anode active material layer forming step). Then, a solid electrolyte layer is formed (solid electrolyte layer forming step). The present invention is characterized in that the above-mentioned solid electrolyte layer forming step or the above-mentioned electrode active material layer forming step is carried out by the procedure mentioned in the "B. Production method for a solid electrolyte layer" or the "C. Production method for an electrode active material layer".

Moreover, in general, it comprises an assembly step of assembling an all-solid-state battery using the cathode active material layer, the anode active material layer, and the solid electrolyte layer obtained in the above-mentioned steps.

Moreover, in the present invention, as shown in FIG. 4B, an all-solid-state battery may be assembled in the assembly step after forming the anode active material layer (anode active material layer forming step) and forming the solid electrolyte layer on the anode active material layer (solid electrolyte layer forming step), using the laminate of the above-mentioned anode active material layer and the solid electrolyte layer, and a cathode active material layer formed additionally in the cathode active material layer forming step. FIGS. 4A, 4B are merely examples of the production method for an all-solid-state battery of the present invention, and thus it is not limited thereto.

In the present invention, preferably, either one of the above-mentioned solid electrolyte layer forming step or electrode active material layer forming step is to be contained, however, it is more preferable to have both steps. Thereby, the layers can be formed homogeneously and the layers can be adhered preferably at the interface.

Since the procedure in the solid electrolyte layer forming step and the solid electrolyte layer to be obtained are explained in the above-described "B. Production method for a solid electrolyte layer", the explanation is omitted here.

Moreover, since the procedure in the electrode active material layer forming step and the electrode active material layer to be obtained are explained in the above-described "C. Production method for an electrode active material layer", the explanation is omitted here.

In the production method for an all-solid-state secondary battery of the present invention, optional steps other than the above-described steps may be added optionally. As such a step, for example, a step of forming a solid electrolyte layer or an electrode active material layer by a procedure other than the procedures mentioned in the "B. Production method for a solid electrolyte layer" or the "C. Production method for an electrode active material layer" can be presented. Specifically, a step of forming a pellet by pressuring the solid electrolyte layer material or the electrode active material layer material can be presented.

Moreover, an assembly step of assembling the all-solid-state battery, a sealing step of sealing the assembled all-solid-state battery into a battery case, and the like can be presented. For the battery case used in the present invention, a common battery case for a battery can be used. As the battery case, for example, an Al-deposited laminate sheet and a SUS battery case can be presented.

As the kind of the all-solid-state battery (battery) produced by the production method of the present invention, for example, a lithium battery, a sodium battery, a magnesium battery, and a calcium battery can be presented. In particular, a lithium battery is preferable. Furthermore, the battery of the present invention may be either a primary battery or a secondary battery, however, it is preferably a secondary battery because it can be charged and discharged repeatedly so that it is useful for example as a vehicle-mounting type battery. Moreover, as the shape of the battery of the present invention, for example, a coin type, a laminate type, a cylindrical type and a rectangular type can be presented.

The present invention is not limited to the above-mentioned embodiments. The above-mentioned embodiments are merely examples, and thus any of those substantially having the same configuration as the technological idea disclosed in the claims of the present invention for achieving the same effects is incorporated in the technological range of the present invention.

EXAMPLES

Hereafter, with reference to the examples, the present invention will be explained further specifically. Unless otherwise specified, operations were carried out in a glove box filled with an Ar gas or in an Ar gas atmosphere.

Example 1-1

(Synthesis of a Sulfide Solid Electrolyte Material)

As the starting materials, lithium sulfide ($Li_2S$) and phosphorus pentasulfide ($P_2S_5$) were used. Powders thereof were measured to have a molar ratio of $Li_2S:P_2S_5=75:25$ so as to be mixed in an agate mortar. Then, 2 g of the mixture was introduced into a 45 ml of zirconia pot, 4 g of dehydrated heptane (moisture content 30 ppm or less) was introduced, and furthermore, a zirconia ball ($\phi$5.5 mm, 53 g) was introduced, and then the pot was completely sealed. With the pot mounted on a planetary type ball mill machine (P7™ produced by Fritsch Japan Co., Ltd.), a mechanical milling operation was carried out for 20 times with a 500 rpm base plate rotational frequency by a one hour process and 15 minutes pause cycle. Furthermore, after adding 6 mol % of $Li_2O$, the mechanical milling was carried out in the same conditions as mentioned above. Thereafter, the obtained specimen was dried on a hot plate set at 100° C. for removing the heptane so as to obtain a sulfide solid electrolyte material (sulfide glass, $Li_2S$—$Li_2O$—$P_2S_5$).

Production of the Slurry

A slurry was obtained by measuring the above-mentioned sulfide solid electrolyte material and triethyl amine by the weight ratio of sulfide solid electrolyte material:triethyl amine=40:60, and mixing.

Examples 1-2 to 1-4

A slurry was obtained in the same manner as in the example 1 except that cyclopentyl methyl ether, ethane mercaptan and tert-dodecyl mercaptan were each used instead of triethyl amine.

Comparative Examples 1-1 to 1-3

The same steps as in the example 1 were carried out except that acetic acid, acetone and cyclohexanon were each used instead of triethyl amine, however, the sulfide solid electrolyte material was dissolved in each dispersion medium so as to fail to obtain a slurry.

Comparative Examples 1-4, 1-5

A slurry was obtained in the same manner as in the example 1 except that heptane and toluene were each used instead of triethyl amine.

[Evaluation 1]
(Li Ion Conductivity Measurement)

The Li ion conductivity (ordinary temperature) was measured by an alternative current impedance method for the samples obtained by scraping out the powders obtained by applying and drying the slurries obtained in the examples 1-1 to 1-4 and the comparative examples 1-4, 1-5 onto a stainless steel or aluminum foil, and shaping the same into a $\phi$11.28 mm×0.5 mm cylindrical shape. For the measurement, Solatron 1260™ was used. The measurement conditions included the 10 mV applied voltage and 0.01 MHz to 1 MHz of the measurement frequency band. Results thereof are shown in the table 1.

TABLE 1

|  | Dispersion medium | Rational formula | Functional group, and the like | Li ion conductivity | Boiling point | Vapor pressure |
|---|---|---|---|---|---|---|
| Example 1-1 | Triethyl amine | $(CH_3CH_2)_3N$ | Tertinary amine | $4.1 \times 10^{-4}$ S/cm | 90° C. | 7.80 kPa (25° C.) |
| Example 1-2 | Cyclopentyl methyl ether | $C_5H_9OCH_3$ | Ether | $4.9 \times 10^{-4}$ S/cm | 106° C. | 4.49 kPa (25° C.) |
| Example 1-3 | Ethane mercaptan | $C_2H_5SH$ | Thiol | $2.2 \times 10^{-4}$ S/cm | 35° C. | 58.90 kPa (20° C.) |
| Example 1-4 | Tert-dodecyl mercaptan | $C_{12}H_{25}SH$ | Thiol | $1.6 \times 10^{-4}$ S/cm | 251° C. | 0.013 kPa (24° C.) |
| Comparative Example 1-1 | Acetic acid | $CH_3COOH$ | Carboxyl | Not measurable | 118° C. | 1.50 kPa (20° C.) |
| Comparative Example 1-2 | Acetone | $CH_3COCH_3$ | Ketone | Not measurable | 57° C. | 24 kPa (20° C.) |
| Comparative Example 1-3 | Cyclohexanon | $C_6H_{10}O$ | Ketone | Not measurable | 156° C. | 0.45 kPa (20° C.) |
| Comparative Example 1-4 | Heptane | $CH_3(CH_2)_5CH_3$ | Alkane | $3.1 \times 10^{-4}$ S/cm | 98° C. | 4.6 kPa (20° C.) |
| Comparative Example 1-5 | Toluene | $C_6H_5CH_3$ | Benzene | $2.4 \times 10^{-4}$ S/cm | 111° C. | 2.90 kPa (20° C.) |

As shown in the table 1, it was confirmed that the samples produced from the slurries obtained in the examples 1-1 to 1-4 each had a high Li ion conductivity of $1 \times 10^{-4}$ S/cm or higher, which is approximately the same as those of the comparative examples 1-4, 1-5 using the conventional non-polar solvents as the dispersion medium for the sulfide solid electrolyte material. Therefore, it was suggested that the slurry of the present invention is a practical slurry while comprising a polar solvent as the dispersion medium for the sulfide solid electrolyte material.

Example 1-5

A slurry was obtained in the same manner as in the example 1-1 except that the sulfide solid electrolyte material was synthesized as follows.
(Synthesis of the Sulfide Solid Electrolyte Material)
As the starting materials, lithium sulfide ($Li_2S$), phosphorus pentasulfide ($P_2S_5$) and lithium iodide (LiI) were used. After measuring $Li_2S$ and $P_2S_5$ to have a molar ratio of $Li_2S:P_2S_5=75:25$, LiI was measured to be 30 mol % so as to be mixed in an agate mortar together. Then, 1 g of the mixture was introduced into a 45 ml of zirconia pot, 4 g of dehydrated heptane (moisture content 30 ppm or less) was introduced, and furthermore, a zirconia ball ($\phi$5.5 mm, 53 g) was introduced, and then the pot was completely sealed. With the pot mounted on a planetary type ball mill machine (P7™ produced by Fritsch Japan Co., Ltd.), a mechanical milling operation was carried out for 40 times with a 500 rpm base plate rotational frequency by a one hour process and 15 minutes pause cycle. Thereafter, the obtained specimen was dried on a hot plate set at 100° C. for removing the heptane so as to obtain a sulfide solid electrolyte material (sulfide glass, LiI—$Li_2S$—$P_2S_5$).

Examples 1-6 to 1-11

A slurry was obtained in the same manner as in the example 5 except that tributyl amine, cyclopentyl methyl ether, dibutyl ether, anisol, n-butyl butyrate, and ethyl benzoate were used instead of triethyl amine.

Comparative Examples 1-6, 1-7

The same steps as in the example 5 were carried out except that butyl amine and propyl acetate were each used instead of tributyl amine, however, the sulfide solid electrolyte material was dissolved in each dispersion medium so as to fail to obtain a slurry.

Comparative Examples 1-8 to 1-11

A slurry was obtained in the same manner as in the example 5 except that isopropyl acetate, butyl acetate, n-ethyl butyrate and heptane were each used instead of tributyl amine.
[Evaluation 2]
(Li Ion Conductivity Measurement)
The Li ion conductivity (ordinary temperature) was measured by an alternative current impedance method for the samples obtained by scraping out the powders obtained by applying and drying the slurries obtained in the examples 1-5 to 1-11 and the comparative examples 1-8, 1-11 onto a stainless steel or aluminum foil, and shaping the same into a $\phi$11.28 mm×0.5 mm cylindrical shape. For the measurement, Solatron 1260™ was used. The measurement conditions included the 10 mV applied voltage and 0.01 MHz to 1 MHz of the measurement frequency band. Results thereof are shown in the table 2.

TABLE 2

|  | Dispersion medium | Rational formula | Functional group, and the like | Li ion conductivity | Boiling point | Vapor pressure |
|---|---|---|---|---|---|---|
| Example 1-5 | Triethyl amine | $(CH_3CH_2)_3N$ | Tertinary amine | $1.1 \times 10^{-3}$ S/cm | 90° C. | 7.80 kPa (25° C.) |
| Example 1-6 | Tributyl amine | BuN(Bu)Bu | Tertinary amine | $9.2 \times 10^{-4}$ S/cm | 217° C. | 12.50 kPa (25° C.) |
| Example 1-7 | Cyclopentyl methyl ether | $C_5H_9OCH_3$ | Ether | $1.4 \times 10^{-3}$ S/cm | 106° C. | 4.49 kPa (25° C.) |

TABLE 2-continued

| | Dispersion medium | Rational formula | Functional group, and the like | Li ion conductivity | Boiling point | Vapor pressure |
|---|---|---|---|---|---|---|
| Example 1-8 | Dibutyl ether | Bu—O—Bu | Ether | $1.1 \times 10^{-3}$ S/cm | 142° C. | 0.64 kPa (20° C.) |
| Example 1-9 | Anisole | $C_6H_5OMe$ | Ether | $1.0 \times 10^{-3}$ S/cm | 155° C. | 1.3 kPa (42° C.) |
| Example 1-10 | N-butyl n-butyrate | $CH_3CH_2CH_2COOBu$ | Ester | $9.0 \times 10^{-4}$ S/cm | 164° C. | 0.24 kPa (25° C.) |
| Example 1-11 | Ethyl benzoate | $C_6H_5COOEt$ | Ester | $9.5 \times 10^{-4}$ S/cm | 213° C. | 0.13 kPa (44° C.) |
| Comparative Example 1-6 | Butyl amine | $Bu—NH_2$ | Primary amine | Not measurable | 77° C. | 10.90 kPa (20° C.) |
| Comparative Example 1-7 | Propyl acetate | $CH_3COO(CH_2)_2CH_3$ | Ester | Not measurable | 102° C. | 5.30 kPa (28.8° C.) |
| Comparative Example 1-8 | Isopropyl acetate | $CH_3COOCH(CH_3)_2$ | Ester | $2.1 \times 10^{-5}$ S/cm | 89° C. | 5.30 kPa (17° C.) |
| Comparative Example 1-9 | Butyl acetate | $CH_3COOBu$ | Ester | $9.4 \times 10^{-6}$ S/cm | 125° C. | 2.00 kPa (25° C.) |
| Comparative Example 1-10 | N-ethyl butyrate | $CH_3CH_2CH_2COOEt$ | Ester | $9.1 \times 10^{-5}$ S/cm | 120° C. | 0.24 kPa (25° C.) |
| Comparative Example 1-11 | Heptane | $CH_3(CH_2)_5CH_3$ | Alkane | $1.2 \times 10^{-3}$ S/cm | 98° C. | 4.6 kPa (20° C.) |

As shown in the table 2, it was confirmed that the samples produced from the slurries obtained in the examples 1-5 to 1-11 each had a high Li ion conductivity of approximately $1 \times 10^{-3}$ S/cm, which is equivalent to that of the comparative example 1-11 using the conventional non-polar solvents as the dispersion medium for the sulfide solid electrolyte material. Therefore, it was suggested that the slurry of the present invention is a practical slurry while comprising a polar solvent as the dispersion medium for the sulfide solid electrolyte material. On the other hand, the samples produced from the slurries obtained in the comparative examples 1-8 to 1-10 each had a low Li ion conductivity.

Example 2-1

(Synthesis of the Sulfide Solid Electrolyte Material)

A sulfide solid electrolyte material was obtained in the same manner as in the example 1-5.

(Production of a Cathode)

A slurry solvent was prepared by the following procedure. First, as the main solvent, heptane (produced by Nakalai Tesque, Inc., dehydration grade), as the sub solvent, tri-n-butyl amine (produced by Tokyo Chemical Industry Co., Ltd.) subjected to dehydration process with a molecular sieve were used. By blending the above-mentioned main solvent: sub solvent by a 82:18 weight ratio, a solvent mixture was obtained.

As the active material, $LiNi_{1/3}Co_{1/3}Mn_{1/3}O_2$, as the binder, a hydrogenated butadiene rubber with an amine group introduced to the end, and as the electric conduction auxiliary agent, VGCF, were prepared. The solid component was adjusted so that the weight ratio of the active material and the sulfide solid electrolyte material was 70:30, the binder was 1.5 weight parts with respect to 100 weight parts of the active material, and VGCF was 3.0 weight parts with respect to 100 weight parts of the active material. A cathode active material layer forming slurry was obtained by blending the solvent mixture and the solid component so as to have the solid component ratio of 63 wt %, and mixing the same with a ultrasonic homogenizer (produced by SMT Co., Ltd., UH-50™). A cathode active material layer was formed by applying and drying the cathode active material layer forming slurry onto an aluminum foil with a carbon applied foil (produced by Show Denko K.K., SDX™) using an applicator. A cathode was obtained by punching out the above-mentioned aluminum foil and the cathode active material layer by 1 $cm^2$.

(Production of an Anode)

As the anode active material, MF-6™ (Mitsubishi Chemical Corporation), as the binder, a hydrogenated butadiene rubber with an amine group introduced to the end was prepared. The solid component was adjusted so that the weight ratio of the active material and the sulfide solid electrolyte material was 58:42, and the binder was 1.1 weight parts with respect to 100 weight parts of the active material. An anode active material layer forming slurry was obtained by blending the solid component and the solvent mixture which was the same as that used for the cathode so as to have the solid component ratio of 63 wt %, and mixing the same with a ultrasonic homogenizer (produced by SMT Co., Ltd., UH-50™). An anode active material layer was formed by applying and drying the anode active material layer forming slurry onto a copper foil using an applicator. An anode was obtained by punching out the above-mentioned copper foil and the anode active material layer by 1 $cm^2$.

(Production of a Battery)

A solid electrolyte layer was produced. A solid electrolyte layer forming slurry was obtained by adding 1 weight part of a hydrogenated butadiene rubber to 100 weight parts of the above-mentioned sulfide solid electrolyte material in an inert gas, and furthermore a dehydrated heptane so as to have the solid component of 35 wt %, and mixing the same with a ultrasonic homogenizer (produced by SMT Co., Ltd., UH-50™). A solid electrolyte layer was obtained by applying and drying the solid electrolyte layer forming slurry onto an aluminum foil using an applicator. A battery was obtained by punching out the aluminum foil and the solid electrolyte layer by 1 $cm^2$, peeling off the aluminum foil so as to superimpose the cathode and the anode facing with each other with the solid electrolyte layer disposed therebetween and pressing by 4.3 ton.

Example 2-2

In the same manner as in the example 2-1 except that the following solvent mixture was used as the slurry solvent used at the time of forming the cathode, a cathode active material layer, an anode active material layer, and a battery were produced.

The same solvent mixture as that in the example 2-1 was used except that, as the sub solvent, n-butyl ether (produced by Nakalai Tesque, Inc.) dehydrated with a molecular sieve was used.

Example 2-3

A slurry solvent was prepared by the following procedure. As the main solvent, heptane (produced by Nakalai Tesque, Inc., dehydration grade), and as the sub solvent, n-butyl ether (produced by Nakalai Tesque, Inc.) subjected to dehydration process with a molecular sieve, were used. By blending the above-mentioned main solvent:sub solvent by a 40:60 weight ratio, a solvent mixture was obtained.

In the same manner as in the example 2-1 except that the above-mentioned solvent mixture was used at the time of forming the cathode and the anode, a cathode active material layer, an anode active material layer, and a battery were produced.

Example 2-4

In the same manner as in the example 2-1 except that only n-butyl ether was used as the slurry solvent, a cathode active material layer, an anode active material layer, and a battery were produced.

Example 2-5

In the same manner as in the example 2-1 except that a hydrogenated butadiene rubber was used as the binder, a cathode active material layer, an anode active material layer, and a battery were produced.

Comparative Example 2-1

In the same manner as in the example 2-1 except that only heptane was used as the slurry solvent and a hydrogenated butadiene rubber was used as the binder, a cathode active material layer, an anode active material layer, and a battery were produced.
[Evaluation]
(Evaluation of the State of the Surface of the Electrode Active Material Layer)

By the following method, the state of the electrode active material layer surface was evaluated.

The in-plane average film thickness was measured for the cathode active material layer and the anode active material layer. Moreover, the maximum film thickness and the minimum film thickness of the cathode active material layer and the anode active material layer were measured. The average film thickness, the maximum film thickness and the minimum film thickness of the cathode active material layer and the anode active material layer were values obtained by measuring with a constant pressure thickness measuring device (type: PG20™ produced by Teclock Corporation) by 5 points×5 points divided equally in a range of 80 cm×80 cm of the coated film.

Moreover, whether or not spots are present was observed visually. Results are shown in the table 3. The mark "○" in the table 3 denotes that the maximum film thickness and the minimum film thickness of the cathode active material layer and the anode active material layer were each within ±5% with respect to the average film thickness with spot generation of 5 points or less, and "×" denotes that the above-mentioned film thickness difference or the spot generation was outside the above-mentioned range of "○".

(Measurement of Charge and Discharge Capacity)
The charge and discharge capacity was measured for the batteries obtained in the examples 2-1 to 2-6, and the comparative example 2-1. Specifically, a charge and discharge test was carried out for 0.33 C-CCCV (CV finish condition 1/100 C) in a 4.55 V-3.0 V voltage range with the initial CC discharge capacity value regarded as the charge and discharge capacity. Results are shown in the table 3. In the table 3, the output of the examples 2-1 to 2-5 were calculated as a relative value with the initial state of the comparative example 2-1 as 100. Results are shown in the table 3.
(Measurement of the Output)

The output was measured for the batteries obtained in the examples 2-1 to 2-5 and the comparative example 2-1. Specifically, constant electric discharge (20 mW to 100 mw, each 10 mW) was executed after the SOC adjustment by a 3.6 V so as to have the electric power corresponding to 5 seconds as the output. Results are shown in the table 3. In the table 3, the output of the examples 2-1 to 2-5 were calculated as a relative value with the initial state of the comparative example 2-1 as 100.

TABLE 3

|  | State of the coating surface | Charge and discharge capacity | Output |
|---|---|---|---|
| Example 2-1 | ○ | 113 | 102 |
| Example 2-2 | ○ | 113 | 114 |
| Example 2-3 | ○ | 116 | 102 |
| Example 2-4 | ○ | 116 | 106 |
| Example 2-5 | ○ | 111 | 108 |
| Comparative Example 2-1 | × | 100 | 100 |

It is considered that in the examples 2-1 to 2-5, the dispersion property of the solid component was improved by the dispersion medium, and furthermore, by adding the binder, the dispersion state of the above-mentioned solid component was maintained to the end of the forming step of each layer so that a homogeneous layer was obtained.

On the other hand, according to the comparative example 2-1 using only heptane as the solvent, it is considered that the solid component was easily aggregated in the slurry so as to generate sedimentation, and the like of the solid component in the forming step of each layer so that a homogeneous layer was not obtained.

Moreover, it is considered that the difference of the state of the above-mentioned layer also influenced the battery characteristics.
Reference Signs List
1 cathode active material layer
2 anode active material layer
3 solid electrolyte layer
10 all-solid-state battery

The invention claimed is:
1. A slurry comprising:
a sulfide solid electrolyte material; and
a dispersion medium comprising at least one selected from the group consisting of a tertiary amine; an ether; an ester having a functional group that contains 3 or more carbon atoms bonded with a carbon atom of the ester by a carbon-carbon bond and a functional group that contains 4 or more carbon atoms bonded with an oxygen atom of the ester; and an ester having a benzene ring bonded with a carbon atom of the ester by a carbon-carbon bond,
wherein:
the sulfide solid electrolyte material comprises a material composition including $Li_2S$ and $P_2S_5$; and the ether is at least one selected from the group consisting of cyclopentyl methyl ether, dibutyl ether, and anisole.

2. The slurry according to claim 1, further comprising a non-polar solvent.

3. The slurry according to claim 1, wherein a molar ratio of $Li_2S$ to $P_2S_5$ in the material composition is in a range of from 70:30 to 80:20.

4. The slurry according to claim 1, further comprising a binder.

5. The slurry according to claim 1, wherein the dispersion medium comprises the tertiary amine.

6. The slurry according to claim 1, wherein the dispersion medium comprises at least one selected from the group consisting of triethyl amine, tripropyl amine, and tributyl amine.

7. The slurry according to claim 1, wherein:
the dispersion medium comprises the ester having a functional group that contains 3 or more carbon atoms bonded with a carbon atom of the ester by a carbon-carbon bond and a functional group that contains 4 or more carbon atoms bonded with an oxygen atom of the ester; and
the material composition further comprises LiI.

8. The slurry according to claim 1, wherein the dispersion medium comprises butyl butyrate.

9. The slurry according to claim 1, wherein:
the dispersion medium comprises the ester having a benzene ring bonded with a carbon atom of the ester by a carbon-carbon bond; and
the material composition further comprises LiI.

10. The slurry according to claim 1, wherein the dispersion medium comprises ethyl benzoate.

11. The slurry according to claim 1, wherein the dispersion medium comprises at least one selected from the group consisting of cyclopentyl methyl ether, dibutyl ether, and anisole.

12. A method for producing a solid electrolyte layer comprising:
mixing a sulfide solid electrolyte material and a dispersion medium to form a solid electrolyte layer forming slurry;
applying the solid electrolyte layer forming slurry on a substrate to form a solid electrolyte layer forming coating film; and
drying the solid electrolyte layer forming coating film to form a solid electrolyte layer,
wherein:
the sulfide solid electrolyte material comprises a material composition including $Li_2S$ and $P_2S_5$;
the dispersion medium comprises at least one selected from the group consisting of a tertiary amine; an ether; an ester having a functional group that contains 3 or more carbon atoms bonded with a carbon atom of the ester by a carbon-carbon bond and a functional group that contains 4 or more carbon atoms bonded with an oxygen atom of the ester; and an ester having a benzene ring bonded with a carbon atom of the ester by a carbon-carbon bond; and
the ether is at least one selected from the group consisting of cyclopentyl methyl ether, dibutyl ether, and anisole.

13. The method according to claim 12, wherein a non-polar solvent is also mixed with the sulfide solid electrolyte material and the dispersion medium to form the solid electrolyte layer forming slurry.

14. The method according to claim 12, wherein a binder is also mixed with the sulfide solid electrolyte material and the dispersion medium to form the solid electrolyte layer forming slurry.

15. A method for producing an electrode active material layer comprising:
mixing an electrode active material, a sulfide solid electrolyte material, and a dispersion medium to form an electrode active material layer forming slurry;
applying the electrode active material layer forming slurry on a substrate to form an electrode active material layer forming coating film; and
drying the electrode active material layer forming coating film to form an electrode active material layer,
wherein:
the sulfide solid electrolyte material comprises a material composition including $Li_2S$ and $P_2S_5$;
the dispersion medium comprises at least one selected from the group consisting of a tertiary amine; an ether; an ester having a functional group that contains 3 or more carbon atoms bonded with a carbon atom of the ester by a carbon-carbon bond and a functional group that contains 4 or more carbon atoms bonded with an oxygen atom of the ester; and an ester having a benzene ring bonded with a carbon atom of the ester; and
the ether is at least one selected from the group consisting of cyclopentyl methyl ether, dibutyl ether, and anisole.

16. The method according to claim 15, wherein a non-polar solvent is also mixed with the electrode active material, sulfide solid electrolyte material, and dispersion medium to form the electrode active material layer forming slurry.

17. The method according to claim 15, wherein a binder is also mixed with the electrode active material, sulfide solid electrolyte material, and dispersion medium to form the electrode active material layer forming slurry.

18. A method for producing an all-solid-state battery, the method comprising:
producing a solid electrolyte layer according to the method of claim 12;
wherein the all-solid-state battery comprises:
a cathode active material layer including a cathode active material,
an anode active material layer including an anode active material, and
the solid electrolyte layer formed between the cathode active material layer and the anode active material layer.

19. A method for producing an all-solid-state battery, the method comprising:
producing an electrode active material layer according to the method of claim 15;
wherein the all-solid-state battery comprises:
a cathode active material layer including a cathode active material,
an anode active material layer including an anode active material, and
the electrolyte layer formed between the cathode active material layer and the anode active material layer.

* * * * *